United States Patent [19]

Sato et al.

[11] Patent Number: 4,522,354
[45] Date of Patent: Jun. 11, 1985

[54] FISHING REEL HAVING A SPOOL ROTATION CONTROL MECHANISM

[75] Inventors: Jun Sato; Hideki Nakajima, both of Sakai, Japan

[73] Assignee: Shimano Industrial Company Limited, Osaka, Japan

[21] Appl. No.: 539,173

[22] Filed: Oct. 5, 1983

[30] Foreign Application Priority Data

Oct. 13, 1982 [JP] Japan .................. 57-155550[U]

[51] Int. Cl.³ .............................................. A01K 89/02
[52] U.S. Cl. .............................. 242/219; 242/84.52 B; 242/220
[58] Field of Search ............ 242/211, 212, 213, 214, 242/216, 217, 218, 219, 220, 84.52 B

[56] References Cited

U.S. PATENT DOCUMENTS

| | | | |
|---|---|---|---|
| 396,956 | 1/1889 | Prouty | 242/213 |
| 1,547,297 | 7/1925 | Case | 242/219 X |
| 2,129,386 | 9/1938 | Schafer | 242/219 |
| 2,760,357 | 8/1956 | Burns | 242/219 |
| 4,049,217 | 9/1977 | Koopman | 242/219 X |

Primary Examiner—Stuart S. Levy
Assistant Examiner—Katherine Jaekel
Attorney, Agent, or Firm—Stevens, Davis, Miller & Mosher

[57] ABSTRACT

A fishing reel comprises a spool shaft having a spool and which is supported rotatably between a pair of frames so that the spool shaft is driven through a clutch by a drive mechanism having a drag mechanism and which is provided with a clutch operating mechanism which is operated to disengage the clutch to allow the spool to freely rotate. The drive mechanism is provided at a main gear thereof with a stopper gear rotatable together therewith, one of the frames is provided with a stopper engageable with the stopper gear to impede the reverse rotation of spool, and the frame is provided with an operating segment for the stopper, thereby enabling engagement and disengagement of stopper with or from the stopper gear.

3 Claims, 3 Drawing Figures

FISHING REEL HAVING A SPOOL ROTATION CONTROL MECHANISM

FIELD OF THE INVENTION

This invention relates to a fishing reel, and more particularly to a fishing reel which has a spool shaft having a spool and which is supported rotatably between a pair of frames. A drive mechanism having a handle rotates the spool to wind up thereon a fishing line and a clutch operating mechanism is operated to disengage a clutch to allow the spool to freely rotate for casting.

BACKGROUND OF THE INVENTION

This kind of fishing reel is well-known as the double bearing reel, which has the clutch and a clutch operating mechanism, the clutch being disengaged thereby to permit free rotation of the spool for casting, and engaging to transmit a driving force from the handle to the spool shaft through the clutch and drive mechanism, thereby permitting the winding up of the line onto the spool.

The drive mechanism comprises a handle shaft having a handle, a main gear supported rotatably to the handle shaft, a drag mechanism for transmitting a driving force from the handle shaft to the main gear, and a pinion engaging normally with the main gear. When the fishing line which is wound onto the spool by the handle through the engaged clutch, is subjected to tension overcoming the rotational resistance set in the drag mechanism, the spool and spool shaft rotate relative to the handle and handle shaft by virtue of a slip of the drag mechanism, thereby preventing the line from being subject to a load exceeding its break point.

In this case, the handle and handle shaft are idle, or the spool and spool shaft rotate reversely with respect to the handle shaft to thereby draw the line out of the spool.

When an angler releases his hold of the handle during the reverse rotation of spool, the handle and handle shaft rotate reversely following the spool, whereby the spool is free from the rotational resistance imported by the drag mechanism, resulting in that the line is drawn excessively from the spool.

Therefore, a stopper gear and a stopper engageable therewith have hitherto been provided at the handle shaft and frame respectively to prevent the reverse rotation of the handle shaft so that even when the line is subjected to a larger tension, an angler can release his hold of the handle.

Such an anti-reverse rotation mechanism, which provides the stopper gear on the handle shaft, can prevent reverse rotation thereof but not of the spool and spool shaft.

The reverse rotation of spool shaft can be impeded to a certain extent by increasing the rotational resistance set in the drag mechanism, which is limited so that the rotational resistance, even when adjusted to a maximum, cannot completely prevent the reverse rotation of the spool shaft. Hence, the spool slidably reversely rotates to draw out permit the line to be drawn therefrom by virtue of the action of the drag mechanism, thereby creating a problem in that the angler, even when intending to hook a big fish in a stroke, cannot do so.

SUMMARY OF THE INVENTION

In the light of the above problem, this invention has been designed. An object of the invention is to provide a fishing reel which can reliably impede the reverse rotation of spool during the winding up of the fishing line through engagement of a clutch, thereby enabling one to hook a fish in a stroke, and which allows the spool to slidably rotate by a drag mechanism when a drive mechanism drives the spool.

This invention is characterized in that the fishing reel, which has a spool shaft having a spool and which is supported rotatably between a pair of frames so that a drive mechanism having a drag mechanism drives the spool shaft and which is provided with a clutch operating mechanism operated to disengage the clutch so as to allow the spool to freely rotate, also has a stopper gear at a main gear constituting the drive mechanism and a stopper engageable with the stopper gear at one frame, thereby impeding reverse rotation of the main gear, and in turn the spool.

In other words, the invention does not impede the reverse rotation of the handle shaft as conventional, but engages the stopper with the main gear to impede reverse rotation thereof, thereby ensuring the prevention of reverse rotation of the spool regardless of rotational resistance of the drag mechanism, thereby enabling a fish to be hooked in a stroke.

In addition, the aforesaid construction includes integral coupling of the main gear with a stopper gear provided independently thereof, integral formation of a stopper gear with the main gear, and utilization of teeth of the main gear as those of the stopper gear, the stopper providing an operating member to enable engagement and disengagement of the stopper with and from the stopper gear from the exterior of the frame.

These and other objects of the invention will become more apparent in the detailed description and examples which follow.

DETAILED DESCRIPTION OF THE INVENTION

Figure 1:
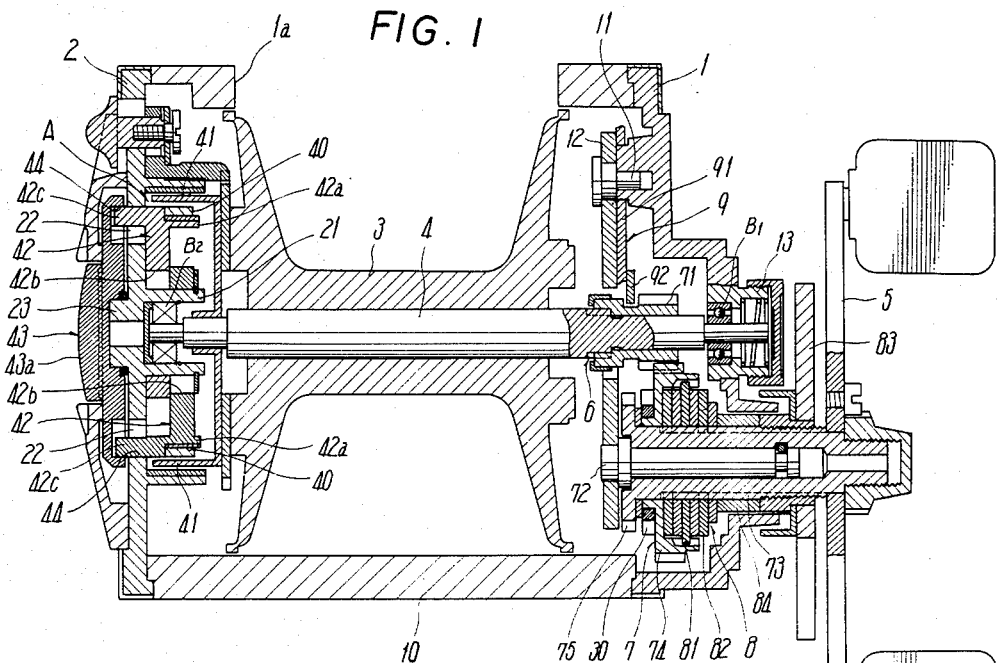
FIG. 1 is a longitudinal sectional front view of an embodiment of a fishing reel of the invention.

Referring to FIG. 1, reference numerals 1 and 2 designate a pair of first and second frames mounted to both axial ends of a cylindrical connecting member 10 open 10a at one side, the first frame 1 being cup-like-shaped and providing at the open side a plate 12 fixed to the frame 1 through, for example, three stays 11 and at the central portion a support cylinder 13 carrying a bearing $B_1$, the second frame 2 being disc-like-shaped and providing at the central portion a support cylinder 21 carrying a bearing $B_2$.

A spool 3 is disposed between the first and second frames 1 and 2 and a spool shaft 4 fixing the spool 3 is supported rotatably between the frames 1 and 2 through the bearings $B_1$ and $B_2$ so that a driving force is transmitted from a handle 5 to the spool shaft 4 through a clutch 6 and a drive mechanism 7 including a drag mechanism 8 to thereby drive the spool 3, the clutch 6 being adapted to be engaged or disengaged by a clutch operating plate 91.

The clutch 6 comprises flat faces provided at an intermediate portion of spool shaft 4 and a cylinder having a not-round inner surface engageable with the flat faces and provided at a pinion 71 supported rotatably and axially slidably to the spool shaft 4, so that the cylinder at the pinion 71 is disengaged from the flat faces at the spool shaft 4 by forward movement of clutch operating plate 91 to allow the spool shaft 4 and spool 3 fixed thereto to freely rotate.

The drive mechanism 7 comprises the pinion 71, a handle shaft 73 supported rotatably to the fixed plate 12 at the first frame 1 through a support shaft 72, a main gear 74 supported rotatably to the handle shaft 73 in part thereof entering into the first frame 1 and engageable with the pinion 71, a drag mechanism 8, and an anti-reverse-rotation gear 75 for the handle shaft 73 and fixed thereto. The driving force from the handle 5 is transmitted to the spool shaft 4 through the drag mechanism 8, main gear 74, pinion 71, and the clutch 6 between the pinion 7 and the spool shaft 4, thereby driving the spool 3. In addition, the anti-reverse-rotation gear 75 engages always with an anti-reverse-pawl 76 to impede the reverse rotation of handle shaft 73, the gear 75 and pawl 76 being not indispensable.

The drag mechanism 8 comprises a plurality of friction plates 81 supported onto the handle shaft 73, contact plates 82 abutting against the friction plates 81 respectively, a drag lever 83 interposed between the outermost friction plate 82 and the handle 5, and a washer 84 interposed between the drag lever 83 and the outermost friction plate 81, the contact plates 82 being supported not-rotatably and axially movably to the handle shaft 73, the drag lever 82 screwing with the handle shaft 73 and rotatably operated to axially move the contact plates 82 to thereby press-contact with the friction plates 81. Hence, the driving force is transmitted from the handle shaft 73 to the main gear 74 through the contact plates 82 and friction plates 81. The press-contact force of drag lever 83 to the friction plates 81 is reduced, thereby enabling the main gear 74 to be slidably rotatable with respect to the handle shaft 73.

The clutch operating mechanism 9 comprises a clutch yoke 92 urging the pinion 71 to normally engage the clutch 6, a furcate clutch-operating plate 91 having an urging portion 91a for the yoke 92, and an operating member 93 for the clutch operating plate 91. The clutch operating plate 91 is supported to the first frame 1 in relation of being reciprocable perpendicularly to the spool shaft 4, the operating member 93 being supported rotatably to the first frame 1 and rotatable to move the clutch operating plate 91 forwardly, thereby moving the clutch yoke 92 axially of pinion 71, thus moving the pinion 71 in the direction of disengaging the clutch 6. The operating member 93 is also operable to move backwardly the clutch operating plate 91, so that the clutch yoke 92 is adapted to urge the pinion 71 to engage the clutch mechanism 6. In addition, the clutch operating plate 91 is provided at the root supported to the first frame 1 with an engaging recess 91b. The operating member 93 comprises, for example, a round control 93a and an engaging stem 93b projecting from the eccentric position at the control 93a, the control 93a being pivoted at the center to the first frame 1, the stem 93b engaging with the engaging recess 91b so that the operating member 93 is rotatably operated to actuate the clutch operating plate 91. Also, the operating member 93 is adapted to be subjected to a predetermined rotational resistance to maintain the clutch operating plate 91 at each termination of its reciprocation.

The fishing reel of the invention constructed as abovementioned is provided at the main gear 74 with a stopper gear 30 rotatable together therewith and at the fixed plate 12 fixed to the first frame 1 with a stopper 31 engageable with the stopper gear 30 to impede the reverse rotation of spool 3, and has an operating segment supported to the frame 1, through which the stopper 31 is operative from the exterior, thereby enabling engagement and disengagement of stopper 31 with and from the stopper gear 30.

The stopper 31 comprises a pawl having an engagement 31a engageable with each tooth of stopper gear 30, and has, for example, an arm 31b provided at the pivot side to the fixed plate 12 and projecting outwardly, and is provided between the stopper 31 and the fixed plate 12 with an spring 33 for biasing the stopper 31 to engage with the stopper gear 30, the operating segment 32 supported to the first frame 1 being operated to disengage the stopper 31 from the stopper gear 30 against a spring force of spring 33.

The operating segment 32 comprises a pivot shaft 32a projecting through the first frame 1 and pivoted thereto, a control (not shown) provided at one end of pivot shaft 32a projecting outwardly from the first frame 1, and a cam body 32b at the other end of pivot shaft 32a within the first frame 1, the cam body 32b engaging with the arm 31b, the operating segment 32 being rotated to shift the engaging position of cam body 32b with the arm 31b, thereby actuating the stopper 31 in the direction of engagement with or disengagement from the stopper gear 30. Also, a torsion spring 34 is interposed between the cam body 32b and the first frame 1 and is adapted to hold the operating segment 32 in the engagement or disengagement position of stopper 31.

Figure 2:
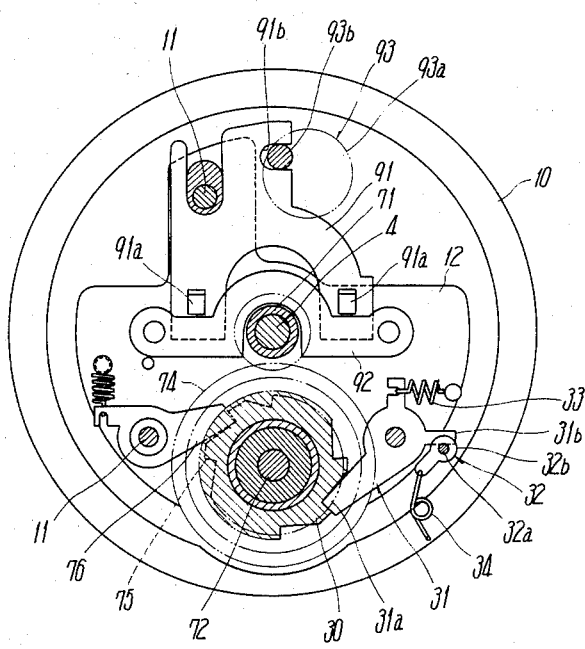
FIG. 2 is a sectional view of the FIG. 1 embodiment cut along a stopper gear.

In addition, in FIGS. 1 and 2, the stopper gear 30 has ratchet teeth at the outer periphery and is disposed coaxially of spool shaft 73 and fixed to one side of main gear 74 through a mounting means, such as fitting, adhesion or set screws. Alternatively, the stopper gear 30 may be supported rotatably to a shaft separate from the handle shaft 73 and interlock with the main gear 74, or be integral therewith. In brief, the stopper gear 30 need only be rotatable together with the main gear 74. Hence, also the teeth of stopper gear 30 may be common to those of main gear 74.

Figure 3:
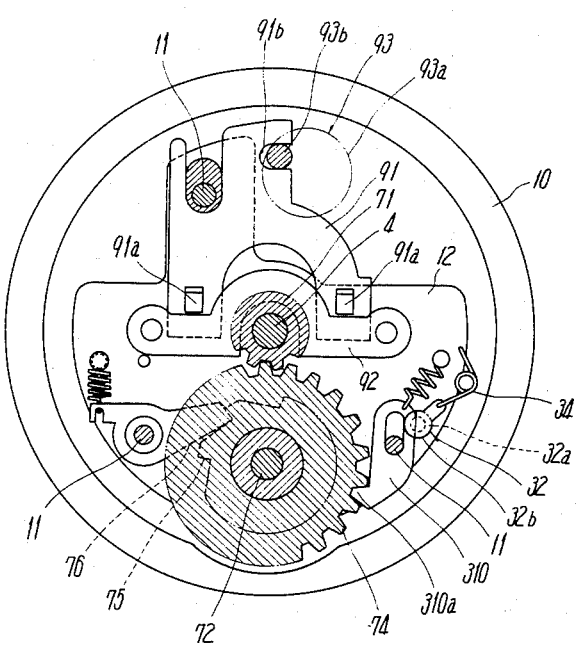
FIG. 3 is a sectional view of a modified embodiment of the invention utilizing the teeth of the main gear as those of stopper gear, corresponding to FIG. 2.

In a case of using the teeth of main gear 74 for the stopper gear 30, a stopper 310, as shown in FIG. 3, has an engaging nose 310a made engageable with each tooth at the main gear 74.

Also, the fishing reel shown in FIG. 1, is provided between the second frame 2 and the spool shaft 4 with a magnet brake A having magnets 40 and an electric conductor 41. The electric conductor 41 is cylindrical and is mounted to the spool 3 or spool shaft 4 concentrically therewith. Non-magnetic holders 42, which have holding portions 42a for magnets 40 at the outer periphery thereof and elongate shaft bores 42b at the central portions, are also provided. The magnets 40 are held on the holding portions 42a and are opposite to the inner periphery of conductor 41. The holders 42 are supported through the elongate shaft bores 42b to the outer surface of support cylinder 21 in relation of being radially outwardly movable and guide bores 22 for radially guiding the holders 42 are provided at the second frame 2 eccentrically of the center thereof. Engaging projections 42c and provided at the lateral sides of holders 42 and are inserted into the guide bores 22 respectively. A disc-like adjuster 43 having a rotary thumbnut 43a is supported rotatably to a support portion 23 at the outer surface of second frame 2, and cam grooves 44 each of circular arc and shifting circumferentially from the outer periphery toward the center are provided at the inner surface of adjuster 43 and engage with the engaging projections 42c respectively. The rotary thumbnut 43a is exposed outwardly from the second fram 2 to be operative from the exterior, and the adjuster 43 is rotated to change the engaging positions of engaging projections 42c with the cam grooves 44 to move the holders 42 radially with respect to the support cylinder 21, thereby adjusting the magnets 40 in position with respect to the conductor 41.

In the fishing reel of the invention, the operating member 93 is operated to forwardly move the clutch operating plate 91 and disengage the clutch 6 as described above, thereby putting the spool 3 in the freely rotatable stage for casting.

After the casting, the operating member 93 is operated to backwardly move the clutch operating plate 91, thereby engaging the clutch 6, and also the operating segment 32 is turned to actuate the stopper 31 or 310 to engage with the stopper gear 30 or main gear 74 whose teeth are in common with the stopper gear 30, so that the angler keeps the spool 3 in a stage ready for winding the line and of impeding the reverse rotation of spool 3.

On the other hand, a driving force is transmitted from the handle 5 to the spool shaft 4 through the handle shaft 73, main gear 74, pinion 71 and clutch mchanism 6, thereby rotating the spool 3 to wind thereon the fishing line.

In this case, the line, when a fish is hooked, is subjected to tension, so that the reverse torque is intended to be transmitted from the spool 3 to the main gear 74 through the spool shaft 4, clutch mechanism 6, and pinion 71, but since the stopper 32 or 310 engages with the stopper gear 30 or main gear 74, to surely impede the reverse rotation of spool 3, the line is not drawn out from the spool 3. Hence, a fish is hooked in a stroke. In addition, since the drive mechanism 7 provides the drag mechanism 8, even if a big fish is hooked to apply a tension larger than a drag force by drag mechanism 8 to the line, a slide is generated in the drag mechanism 8 to restrict winding-up of the line, thereby avoiding a cut thereof. Even in this case, the line is prevented from being drawn out from the spool 3 because the stopper 31 or 310 engages with the stopper gear 30 or main gear 74 to ensure prevention of reverse rotation of spool 3. When the tension of line is reduced, the handle 5 is rotated to further wind up the line for fishing.

Now, the operating segment 32 is operated to disengage the stopper 31 or 310 from the stopper gear 30 or main gear 74 so that the spool 3 is released from the anti-reverse-rotation stage and selectively switched to the stage of acting by means of the drag mechanism 8. Hence, the fishing reel of the invention enables an angler to hook a fish either at with a stroke or by utilizing the characteristic of the drag mechanism 8.

Alternatively, the stopper 31 or 310 may be made slidable, which is not particularly defined. Also, the operating segment 32 may be made slidable or swingable.

As seen from the above, the engagement of the stopper at the frame with the stopper gear at the main gear impedes the reverse rotation of the spool and the stopper operating member allows the stopper to engage or disengage with or from the stopper gear, whereby even when a big fish is hooked during line wind-up, the reverse rotation of spool can surely be prevented avoiding the drawing out of line.

Furthermore, while the reverse rotation of spool by tension of the line during the winding thereof is surely impeded, the spool can be released from the anti-reverse-rotation stage by a simple construction of providing the operating segment to disengage the stopper from the stopper gear. Hence, the fishing reel of the invention is usable for the angler intending to hook a fish either in a stroke or by utilizing the characteristic of drag mechanism, thus being very practical.

While an embodiment of the invention has been shown and described, the invention is not limited to the specific construction thereof, which is merely exemplary in the specification rather than defined.

What is claimed:

1. A fishing reel comprising:
   a pair of frames;
   a spool shaft supporting a spool, said spool shaft being supported rotatably between said frames;
   a drive mechanism for driving said spool shaft and comprising a handle shaft supporting a handle, a main gear supported rotatably to said handle shaft, a drag mechanism for transmitting a driving force from said handle shaft to said main gear, and a pinion engageable always with said main gear;
   a clutch provided between said spool shaft and said pinion;
   a clutch operating mechanism for operating said clutch to engage or disengage said spool shaft to or from said drive mechanism;
   a first anti-reverse-rotation mechanism for preventing said spool shaft from reverse rotation when said clutch is engaged, said first anti-reverse-rotation mechanism comprising a stopper gear rotating together with said main gear, a stopper supported movably to one of said frames and engageable with said stopper gear so as to impede reverse rotation of said main gear, and an operating member supported to said frame for operating said stopper causing it to engage with or disengage from said stopper gear; and,
   a second anti-reverse-rotation mechanism for allowing said spool, when said clutch is engaged, to reversely rotate through said drag mechanism, said second anti-reverse-rotation mechanism comprising an anti-reverse-rotation gear fixed to said handle shaft and an anti-reverse-rotation pawl pivotably supported to said frame for engaging with said anti-reverse-rotation gear.

2. A fishing reel according to claim 1, wherein said stopper gear is independent of said main gear and connected in association therewith.

3. A fishing reel according to claim 1, wherein said stopper gear is independent with said main gear, and the teeth of said stopper gear are the teeth of said main gear.

* * * * *